United States Patent [19]

Warncke

[11] Patent Number: 4,574,799

[45] Date of Patent: Mar. 11, 1986

[54] GAS MASK CONSTRUCTION

[75] Inventor: Ernst Warncke, Lübeck, Fed. Rep. of Germany

[73] Assignee: Drägerwerk Aktiengesellschaft, Fed. Rep. of Germany

[21] Appl. No.: 503,503

[22] Filed: Jun. 13, 1983

[30] Foreign Application Priority Data

Aug. 20, 1982 [DE] Fed. Rep. of Germany ....... 3230939

[51] Int. Cl.$^4$ .................... A62B 7/00

[52] U.S. Cl. .................... 128/206.24; 128/207.12

[58] Field of Search .................... 128/201.23, 201.28, 128/200.27, 204.26, 204.28, 205.13, 205.16, 205.17, 205.25, 206.12, 206.15, 206.21, 206.24, 207.12, 205.12

[56] References Cited

U.S. PATENT DOCUMENTS 4,016,876 4/1977 Martin et al. .................. 128/205.16

*Primary Examiner*—Henry J. Recla

*Attorney, Agent, or Firm*—McGlew and Tuttle

[57] ABSTRACT

A gas mask comprises an outer full mask and an inner half mask for closed cycle respirators leaving an interspace between the half mask and the full mask. The outer mask is sealed around the person's face by one or more sealing frames and the inner mask is sealed with the face around the wearer's nose and mouth. The construction includes a passage between the half mask and a full mask with a check valve which opens with exhalation resistance in a direction toward the space between the full mask and the half mask. The outer full mask has a wall with a linkage compensation device which is closed by a cover and includes a bellows which expands and contracts in the device in accordance with variations in pressure within the interspace between the two masks. A spring is employed to bias the bellows into one of an expanded or contracted situation so that the bellows may either expand or contract against the spring pressure during operation and provide a leakage compensation in the space between the masks.

3 Claims, 1 Drawing Figure

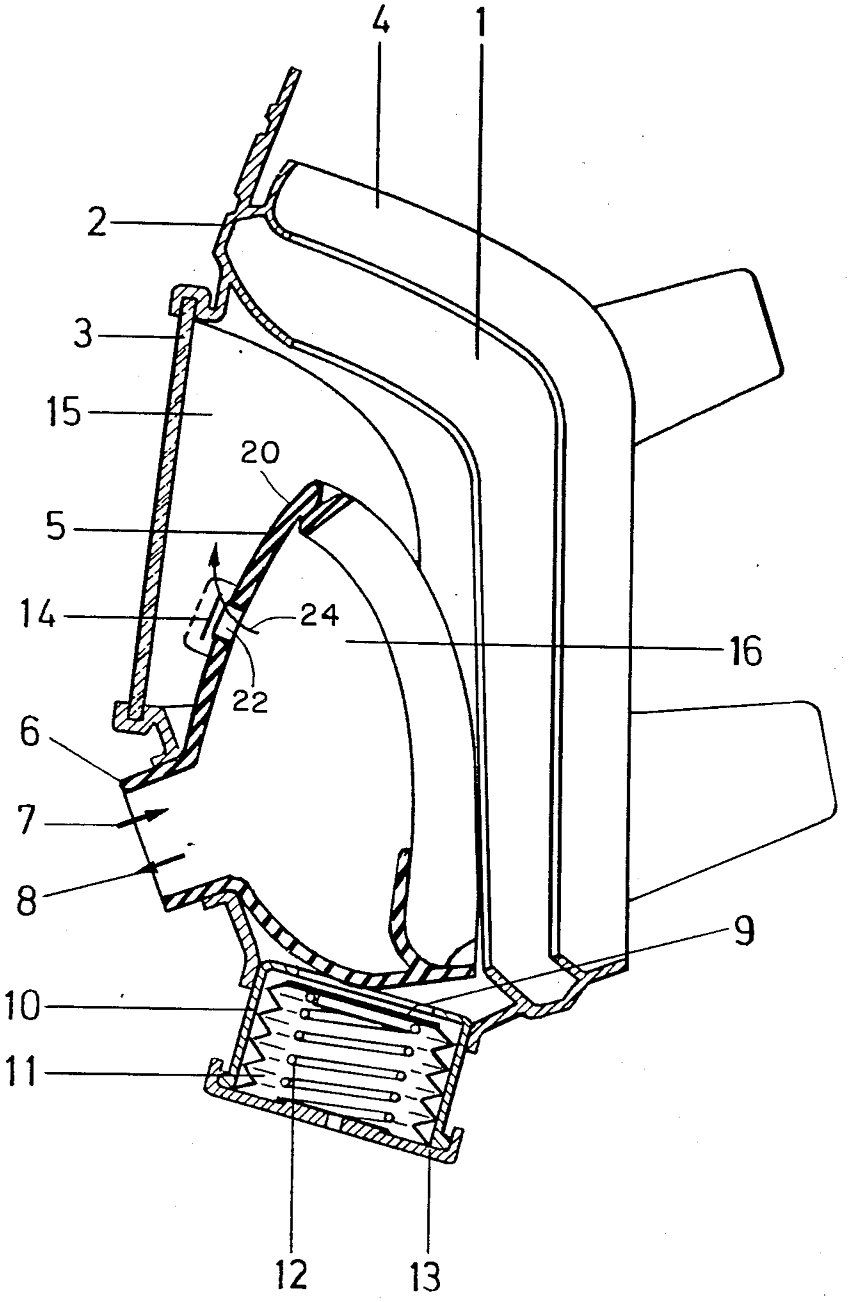
4
1
2
3
15
20
5
14
24
16
22
6
7
8
9
10
11
12
13

GAS MASK CONSTRUCTION

FIELD AND BACKGROUND OF THE INVENTION

This invention relates in general to the construction of breathing devices and in particular to a new and useful gas mask having an outer full mask and an inner half mask and with means for accommodating for leakage by increasing and decreasing the volume in the space between the masks during operation.

A known problem in respirators is their tight connection to the respiratory tracts of the wearer. The safest connection per se is the mouthpiece. However, it is not always pleasant to wear and requires a corresponding discipline of the wearer. Prevalent today is the full mask also with inner mask. The necessary tight connection, however, is achieved with it only if any leakage remaining due to the different face forms are compensated. It must be prevented in any event that air from the surrounding atmosphere can enter through the mask seal or also, as here in closed cycle respirators, that oxygen can issue, because of the fire hazard.

Known is a gas mask with double sealing edge which possesses means for passing exhaled air through the space between the two sealing edges. In the realization the double sealing edge is created by the seal at the full mask and at the inner mask, which covers also the entire face. Inhalation occurs through the connection piece directly into the inner mask. Exhalation occurs via a valve which opens in an exhalation direction in the wall of the inner mask through the interspace between the two masks, either through a further valve means directly to the outside or back into the closed cycle respirator. A slight pressure builds up in the interspace, so that, although when connected to a closed cycle respirator possibly unbreathable ambient air cannot enter the mask space through leakages, cycle air can flow out through the leaks in the sealing edge of the outer mask. This may lead to considerable shortening of the time the mask can be used, as this outflow volume must be replenished from the relatively small oxygen reserve of the respirator; because of the possibly high oxygen percentage, the outflow volume constitutes a great fire hazard. (Swiss Patent No. 473,592).

Known also is a gas mask with inner half mask for closed cycle respirators where through a positive pressure in the space between the two masks, the mask interspace, access of ambient air is prevented. The inner half mask is disposed in a full mask. The latter is in direct communication with the connecting piece which leads to the respirator and through which one inhales and exhales.

In its wall, the inner half mask has a check valve opening in the direction of the mask interspace. On exhaling into the cycle this valve opens, so that exhaled air can flow into the interspace up to the exhalation resistance of the respirator. A corresponding positive pressure is then created in the interspace relative to the surrounding atmosphere. During inhalation the check valve is closed. With the seal of the full mask and of the inner half mask this positive pressure is maintained. If there are slight leaks, it decreases to "zero" during the following inhalation phase. The next exhalation compensates the pressure drop.

However, it is very difficult to seal inner half masks as perfectly as the outer full mask. Thus, there is danger that the positive pressure will decrease too rapidly during the inhalation phase through pressure equalization to the interior of the inner half mask, and that consequently a positive pressure and hence a protection against leakages does not exist in the mask interspace during the entire inhalation phase. (DE-OS No. 30 15 761).

SUMMARY OF THE INVENTION

The invention provides a gas mask with an inner half mask for closed cycle respirators with a slight positive pressure at the seal line relative to the surrounding atmosphere without flow through the mask interspace between the masks, even when, as cannot always be prevented, leakages occur at the seals of the two masks.

According to the invention, this problem is solved in that the full mask contains in its wall a leakage compensation which possesses in a cover a bellows moving with the pressure in the mask interspace against a spring supported on the cover bottom.

The advantages achieved with the invention consist in particular in that the positive pressure, so necessary for safe prevention of access of possibly poisonous surrounding atmosphere, can be maintained for a long time in the mask interspace without any great loss of respiratory air, despite existing small leaks especially at the inner half mask. A small bellows having a volume of about 20 cc will compensate leaks of about 1%, which is a realistic figure. The following data may be taken at basis: At a respiratory air turnover of 30 ltr/min, leakages of 1% result in a leakage loss of 0.3 ltr/min. At 15 respirations per minute this gives a volume outflow per respiration of 20 cc. The elasticity of the full mask contributes to the volume of the bellows.

The leakage compensation makes it possible to check the tight fit on the face when fitting the mask before use of the respiration protection begins. Heretofore this was done by closing the mask connection with the ball of the hand and then creating a vacuum by suction. This testing method, however, has the disadvantage that the wearer of the mask creates too high a vacuum, owing to which the mask is sucked against the face too strongly. With the leakage compensation of the invention a sure testing method results. The wearer can exhale into the mask while holding the mask connection shut. In so doing the bellows is moved counter to the force of the spring. Now if the wearer does not continue to exhale, the bellows would return to the starting position if leaks existed. This tightness test has the advantage that it is carried out at approximately the presssure difference relative to the surrounding atmosphere that occurs in actual operation.

Accordingly it is an object of the invention to provide a gas mask which includes an outer full mask and an inner half mask for closed cycle respirators so that there is a slight positive pressure at the seal line relative to the surrounding atmosphere with respect to the outer mask to provide means for accommodating variations in pressure in the space between the masks even though leakage occurs at the seals of the masks without a gas flow in the space between the masks.

A further object of the invention is to provide an improved gas mask wherein the mask includes two portions, one engaging around the nose and mouth and having a check valve which permits flow into the interspace between the two masks with sealing frames around each mask engaging the wearer's face which includes an expandable and contractible compartment connected to the space between the masks to accommodate for variations in gas pressure due to leakages.

A further object of the invention is to provide a gas mask which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter in which a preferred embodiment of the invention is illustrated.

BRIEF DESCRIPTION OF THE DRAWINGS

In the Drawings:

The only FIGURE of the drawing is a schematic sectional view of the gas mask constructed in accordance with the invention.

GENERAL DESCRIPTION OF THE PREFERRED EMBODIMENT

Referring to the drawings in particular the invention embodied therein comprises a gas mask which includes an outer full mask or mask body 2 and an inner half mask or closed cycle respirator 20. An interspace 15 is defined between the half mask 20 and the full mask 2 and a passage 22 is provided between the interspace 15 and the interior 16 of the inner half mask 20. The passage is provided with a check valve 14 which opens outwardly to provide a flow in the direction of the arrow 24 during exhalation by the user.

In accordance with the invention the outer full mask 2 has a leakage compensation passage or compartment 10 and a leakage compensator device 9. Compensator device 9 is closed by a cover 13 and it includes an expandible and contractible bellows 11, is in communication with the interspace 15, and expands or contracts in accordance with variations of pressure therein caused by leakage from both the inner mask 20 to the interspace 15 and from the interspace 15 to the outside atmosphere.

The gas mask comprises a full mask 1 with the mask body 2, the viewing window 3 and the outer sealing frame 4, inside of which the inner half mask 5 is arranged. The half mask 5 is in direct communication with the connecting piece 6 which leads to the respirator and through which one inhales 7 and exhales 8.

The mask body 2 is provided with a leakage compensation 9, which contains in a cover 10 a bellows 11 and in the latter a spring 12. The cover bottom 13 serves as abutment for the spring 12.

In its wall the inner half mask 5 is provided with an easily closing and opening check valve 14. It opens in the direction of the mask interspace 15 between the full mask 1 and the inner half mask 5. During inhalation the check valve 14 closes, due to the vacuum in the interior 16 of the inner half mask 5. During exhalation, due to the resistance of the connected closed cycle respirator, a slight positive pressure is created; thereby the check valve 14 is opened, so that a part of the exhaled air can flow into the mask interspace 15. Thus by exhalation a positive pressure is built up there as in the interior 16 of the inner half mask 5. At the end of exhalation the check valve 14 closes again. With the positive pressure in the mask interspace 15 the leakage compensation 9 is loaded. The bellows 11 is compressed against the spring 12.

With a good seal of the full mask 1 and of the inner half mask 5 the positive pressure in the mask interspace 15 is maintained during the inhalation phase. In case of slight leaks, the bellows 11, which expands again as the pressure begins to drop via the spring 12, equalizes the volume to the mask interspace 15 again, so that the positive pressure is maintained here until the next exhalation phase.

A problem with respirators is the tight connection to the respiratory tracts of the wearer. Prevalent is a full mask with an inner half mask. The sealing at the wearer's face is critical. If leaks exist, breath poisons could otherwise occur; emerging oxygen means fire hazard.

Known gas masks with inner half mask build up a positive pressure in the mask interspace via a check valve arranged at the inner half mask and opening toward the space between the two masks, the positive pressure permitting only a flow of exhaled air outward if leaks occur. This positive pressure in the mask interspace must be maintained during the inhalation phase, which takes place at negative pressure. Otherwise unfiltered outside air will penetrate.

A leakage compensation in the wall of the full mask comprises a spring loaded bellows which with the exhalation pressure in the mask interspace changes the volume thereof. In case of relatively great leaks, the bellows then equalized the volume difference by expansion of the spring. During this equalization the positive pressure in the mask interspace and hence the safety from access of extraneous gases is maintained.

While specific embodiment of the invention has been shown and described in detail to illustrate the application of the principles of the invention, it will be understood that the invention may be embodied otherwise without departing from such principles.

What is claimed is:

1. A gas mask comprising an outer full mask having a front wall adapted to overlie the wearer's face with an opening therethrough, and an inner half mask having a tubular connecting piece portion supported in and extending through the opening of the full mask adapted to be connected to a respirator for inhaling and exhaling therethrough, said half mask being of a size to overlie the nose, mouth and chin of the wearer, said half mask being spaced from the interior of said full mask and defining an interspace therebetween which may be maintained under positive pressure, said half mask having a wall portion within said full mask and having an opening therethrough and defining a passage between the interspace and the interior of said half mask, a check valve mounted in said passage which opens upon an exhalation in a direction from the interior of said half mask toward the interspace, said full mask having a tubular wall portion below said half mask a cylinder mounted in said tubular wall portion defining a leakage compensation passage extending to the exterior of said full mask, a cover closing a portion of the passage and overlying the outer end of said cylinder and having a hole therein, said cylinder defining an opening at the opposite end thereof, a bellows mounted in said cylinder dividing said passage into first and second chambers, said bellows having an interior wall defining said first chamber communicating with said hole and having an exterior surface communicating with said interspace via said opening, said bellows being expandable and contractible in accordance with the variations of pressure in the interspace and the exterior, and spring means biasing said bellows to an expanded condition toward said opening, said check valve being openable during exhalation to pressurize the interspace and to contract the bellows and being closeable on inhalation, said bellows acting to expand by the force of said spring so as to provide an increase in the pressure between said half mask and said full mask to seal the wearer's face around the full mask.

2. A gas mask according to claim 1, wherein said full mask includes an outer sealing frame extending around the periphery thereof.

3. A gas mask according to claim 1, wherein said cover is transparent.

* * * * *